Dec. 19, 1967   C. M. WEIBULL   3,358,856
SILO UNLOADING DEVICE
Filed April 25, 1966
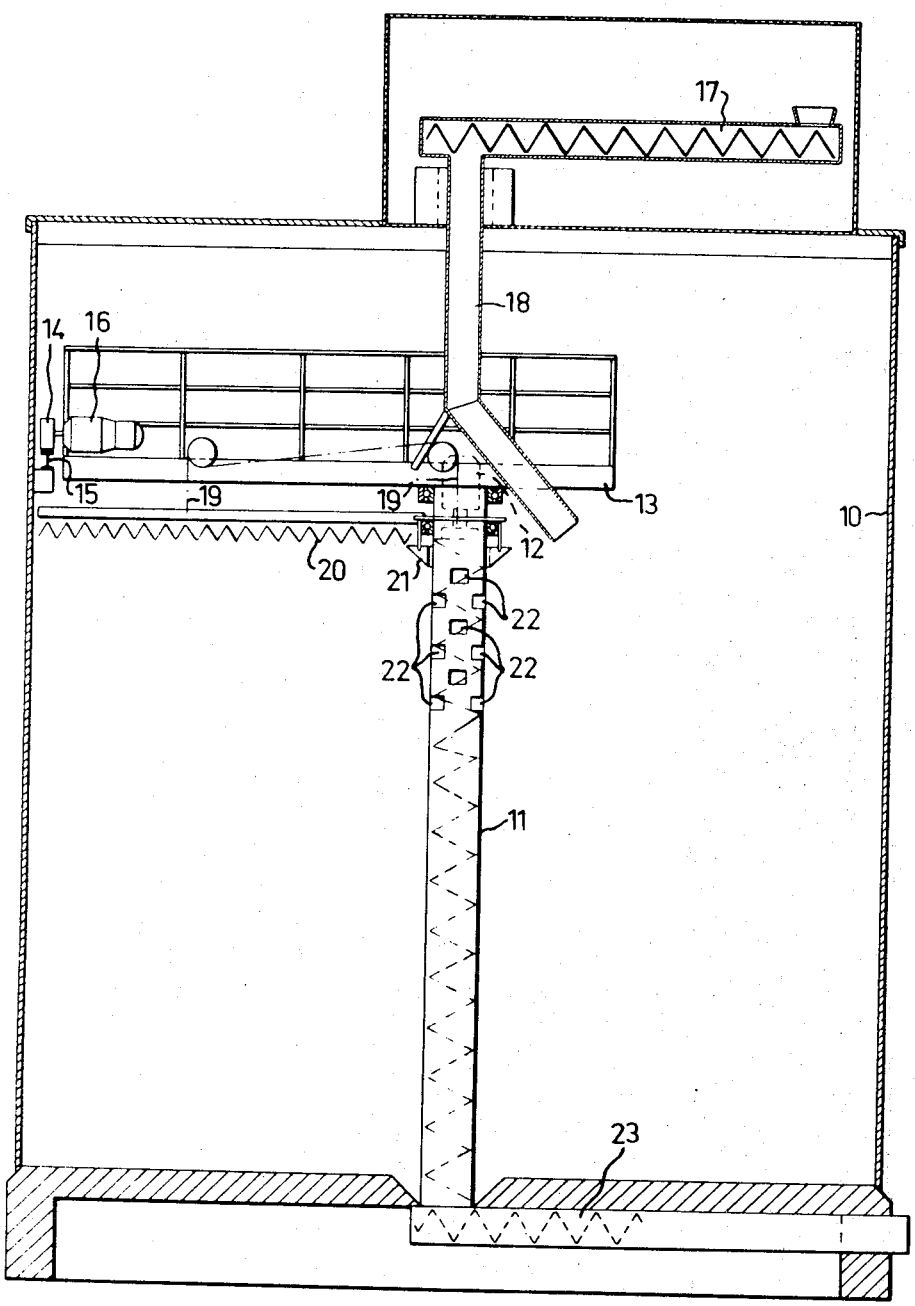
Inventor
Claes Martin Weibull
By
Karl W. Flocks
Attorney United States Patent Office 3,358,856
Patented Dec. 19, 1967

3,358,856
SILO UNLOADING DEVICE
Claes Martin Weibull, Malmo, Sweden, assignor to Ingeniorsfirman Nils Weibull AB, Malmo, Sweden
Filed Apr. 25, 1966, Ser. No. 544,999
5 Claims. (Cl. 214—17)

ABSTRACT OF THE DISCLOSURE

A cylindrical silo for bulk storage of vault-forming material in which a plurality of conveyors completely empty the silo and including radial and annular scrapers for feeding material of the outer periphery of the silo into a central column and a conveyor screw for feeding material axially through the column and then radially from the lower end of the column.

---

This invention relates to a cylindrical silo for bulk storage of vault-forming pulverulent material comprising roof, floor and side walls enclosing a storage space for the material, a hollow cylindrical central column in said storage space secured in said floor and supporting the inner end of a radial beam mounted for pivotal movement on the central column, and a screw type conveyor and/or scraping type conveyor carried by the radial beam and adapted to move the material contained in the silo from the periphery thereof towards and into the interior of the central column through openings in the wall thereof, and a conveyor in said central column for carrying the material supplied to the interior of the column out of the column at one end thereof.

When the material to be stored in bulk in such a silo is a very fine-grained pulverulent material, such as starch, a serious problem is met when the silo is to be emptied, because a material of this type has a tendency of forming vaults, so that the material cannot by itself flow out of the silo when it is desired to empty the silo. To overcome this problem the present invention provides in a silo of the above-mentioned type for bulk storage of vault-forming material the arrangement that the lastmentioned conveyor is a screw conveyor having a cylindrical screw housing which is secured in the floor of the silo and is sufficiently rigid to form in itself the central column, and a feed screw connected to a drive mechanism for driving the feed screw with such a sense of rotation that the material supplied to the interior of the central column is positively carried to and out of the lower end of the central column, and that there is connected to the lower end of the central column a substantially horizontal conveyor for forwarding the material to a point outside the silo, said last-mentioned screw conveyor having at least a conveying capacity equally large as and preferably greater than the screw conveyor forming the central column and being adapted to be driven in coordination with it.

These and further features of the invention will become apparent from the following detailed description in which reference is made to the accompanying drawing diagrammatically illustrating a vertical section of a silo, chosen by way of example, according to the invention.

The silo comprises a cylindrical building structure 10 with floor, side walls and roof. Disposed centrally in the silo is a screw type conveyor 11 the cylindrical screw housing of which has the lower end secured to the floor and the upper end terminating some distance from the roof, said screw housing being of sufficient rigidity to form in itself the central column customary in silos of this type. The feed screw of the screw conveyor 11 is connected to an electric drive motor 12 driving the feed screw in such a sense that it will feed material towards the lower end of the screw conveyor 11. The central column screw conveyor 11 supports a radial beam 13 in the silo adjacent the inner end of the beam, while the outer end of the beam is adapted to run on wheels 14 on a rail 15 disposed around the inner circumferential wall of the silo, at least some wheel being driven by an electric motor 16 for turning the radial beam on the central column screw conveyor 11.

For filling material into the silo a screw type conveyor 17 is mounted on the roof of the silo and connects onto a supply pipe 18 disposed centrally in the roof and capable of turning with the radial beam, said supply pipe having its lower end bent at an angle. For emptying the silo a vertically adjustable screw type conveyor 20 is hung in the radial beam 13 by cables 19, said screw type conveyor being arranged to move material from the periphery of the silo towards the central column screw conveyor 11 but preferably being reversible so as to serve for levelling the material in the silo when the latter is filled. An annular scraping type conveyor 21 surrounding the central column screw conveyor 11 is carried by the screw type conveyor 20. At the rotation caused by the swinging movement of the radial beam the scraping type conveyor 21 in collaboration with the screw type conveyor 20 will supply material to the interior of the central column screw conveyor 11 through openings in the circumferential wall thereof, said openings being distributed throughout the length of said circumferential wall and some of said openings being indicated at 22. A screw type conveyor 23 extending radially out of the silo beneath the floor thereof is connected to the lower end of the central column screw conveyor 11 to carry the material supplied to the central column screw conveyor 11 at the emptying of the silo and positively conveyed to the lower end of the central column by the screw conveyor 11, to a point outside the silo. The screw conveyor 23 has at least a conveying capacity equally large as and preferably greater than the screw conveyor 11. The screw conveyor 23 is adapted to be driven in coordination with the screw conveyor 11, for example in that it is mechanically or electrically connected thereto, to ensure that material cannot clog in the transition between the screw conveyors 11 and 23.

While a preferred embodiment of the invention has been described in the foregoing and shown in the accompanying drawing it is understood by those skilled in the art that modifications can be resorted to within the scope of the appended claims.

What I claim and desire to secure by Letters Patent is:
1. A silo for bulk storage of vault-forming material comprising a roof, floor and side walls forming a cylindrical storage space for said material,
    a hollow cylindrical column secured to said floor, extending axially in said cylindrical storage space and terminating below said roof;
    a power-driven beam journaled on said column and extending radially therefrom substantially to the inner periphery of said cylindrical storage space for rotary movement about the vertical axis of said column;
    conveyor means extending beneath said beam and suspended therefrom for conveying material radially toward said column, said conveyor means and beam being rotatable as a unit;
    said conveyor means including an annular, scraper-type conveyor surrounding said column and movable with said conveyor means about the axis of said column;
    said column including openings in side portions thereof whereby the stored material will enter said column due to action of said scraper-type conveyor;
    said column including a power-driven screw conveyor extending axially thereof for moving the stored material downwardly through said column;
    and a second power-driven screw conveyor extending radially from the lower end of said column for re- ceiving material from said column and directing it outwardly of said silo;

said second conveyor having a capacity at least as great as said first-mentioned screw conveyor and said screw conveyors being operable in coordinated relation.

2. The structure as claimed in claim 1, in which said suspended conveyor means is adjustably suspended for vertical movement along said column in said cylindrical storage space.

3. The structure as claimed in claim 2, in which said side wall includes annular track means about the inner periphery thereof, said beam including at least one wheel element journaled about a radial axis and engaged on said annular track means, said wheel being power driven.

4. The structure as claimed in claim 3, in which a supply pipe is journaled on said roof and is secured to said beam for rotation therewith, said supply pipe including a lower angularly directed portion for distributing material annularly within said cylindrical storage space as said beam is rotated.

5. The structure as claimed in claim 4, in which supply pipe includes a radially disposed conveyor connected thereto and disposed above said silo roof.

References Cited

UNITED STATES PATENTS

| | | | |
|---|---|---|---|
| 772,911 | 10/1904 | Acklin | 214—17 |
| 2,500,043 | 3/1950 | Radtke | 214—17 X |
| 2,863,576 | 12/1958 | Trask | 214—17 |
| 2,933,175 | 4/1960 | Gray | 198—64 |

FOREIGN PATENTS 193,624  12/1964  Sweden.

ROBERT G. SHERIDAN, *Primary Examiner.*